Figure 1:
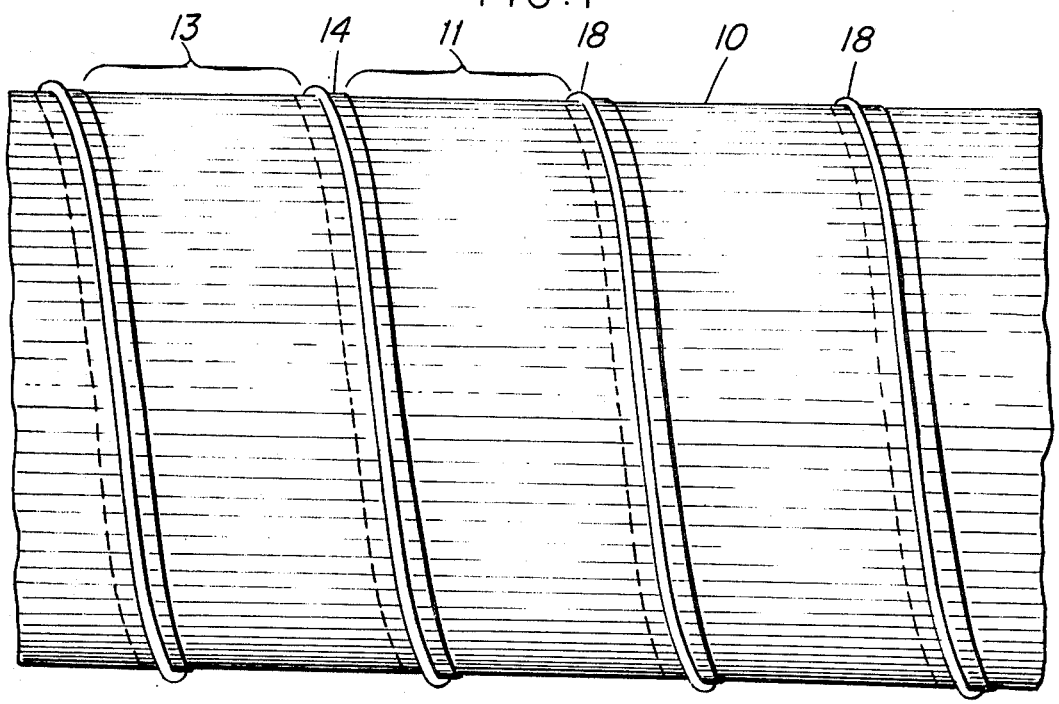

United States Patent [19]

Rejeski

[11] 3,739,815

[45] June 19, 1973

[54] FLEXIBLE COLLAPSIBLE TUBING

[75] Inventor: William E. Rejeski, Farmington, Conn.

[73] Assignee: The Wiremold Company, West Hartford, Conn.

[22] Filed: Apr. 30, 1971

[21] Appl. No.: 138,975

[52] U.S. Cl. ............................... 138/122, 138/129
[51] Int. Cl. ............................................. F16l 11/06
[58] Field of Search .................. 138/122, 129, 131, 138/132, 133, 146, 150, 154, 172, 174

[56] References Cited
UNITED STATES PATENTS

| 2,452,047 | 10/1948 | Hamblin | 138/133 |
| 2,486,387 | 11/1949 | Bringolf | 138/122 |
| 3,323,553 | 6/1967 | Richitelli et al. | 138/122 |
| 3,334,663 | 8/1967 | Peterson | 138/132 |
| 3,428,093 | 2/1969 | Guiles | 138/129 X |
| 3,479,670 | 11/1969 | Medell | 138/129 X |

FOREIGN PATENTS OR APPLICATIONS

| 775,639 | 5/1957 | Great Britain | 138/129 |

Primary Examiner—Martin P. Schwadron
Assistant Examiner—David R. Matthews
Attorney—Davis, Hoxie, Faithfull & Hapgood

[57] ABSTRACT

A flexible strip of elastomeric material, or a fabric strip which is coated with or contains an elastomeric material is wound helically with overlapped edges. A form-giving member of stiff bendable thermoplastic material in rod-like form is laid between the overlapped edges and secured there by self adhesion of the overlapped edges. Then the tubing is heat-treated to heat-set the form-giving helix in its helical form and at the same time cure the strip and to weld the overlapped edges of the strip. The flexible strip is preferably impervious to the passage of gas through it.

10 Claims, 2 Drawing Figures

Patented June 19, 1973  3,739,815

Inventor
William E. Rejeski
By Davis, Hoxie, Faithfull & Hapgood
Attorneys

FLEXIBLE COLLAPSIBLE TUBING

This invention relates to flexible collapsible tubing and more particularly to tubing wound helically from a strip or strips of flexible material and having a helically wound form-giving element incorporated as part of the tubing.

Heretofore, it has been known to make two-element tubing from a strip of flexible material wound helically and having a metal wire lying between overlapped edges of adjacent convolutions of the strip material and secured in place by an adhesive or by stitching the overlapped edges of the strip in parallel with the metal helix and on each side thereof.

The stitching required extra expensive machinery with moving parts to make the tubing. Also, the tubing was perforated by the needle as the stitching was done; and if the flexible strip was of synthetic plastic material, it tended in some instances to tear along the stitching. Moreover, it was not completely sealed due to the needle holes. When adhesive was used, it was often affected by temperature and chemicals, weakening the seam or allowing it to open up.

According to the present invention, a flexible strip of resinous or synthetic plastic material, preferably elastomeric materials, or fabric which is coated with or contains flexible resinous or elastomeric plastic material, is wound helically with overlapped edges. Preferably, the strip is tacky and uncured. A stiff, bendable, form-giving member in rod-like form, preferably made from polyamide or other thermoplastic material, is laid between the overlapped edges of the strip and secured there by self adhesion of the overlapped edges. Then the tubing is heat-treated to heat-set the form-giving helix in its helical form and at the same time to weld the overlapped edges of the flexible strip and to cure the strip. The flexible strip is preferably impervious to the passage of gas through it.

One object of the invention is to provide a new flexible collapsible spirally wound tubing construction which is impervious to the flow of gas through its wall and is made from a flexible strip or strips of flexible resinous material or elastomeric plastic material, or fabric containing or coated with such materials, and which includes a form-giving spiral or helix wound from a rod of non-metallic, thermoplastic material which resists permanent deformation.

Another object is to provide tubing of the aforementioned type which can be economically and rapidly made, and which is constructed to resist tearing, separation or pulling apart of the seams that form adjacent convolutions of the flexible strip.

Another object of the invention is to provide a new method for making tubing having the aforesaid characteristics. An associated object is to provide a new method which includes a step for heat treatment of the originally formed tubing to impart the anti-deformation characteristic to the form-giving helix, to cure the strip, and to impart a permanent welded seam at the overlapping edges of the adjacent convolutions of the strip.

Other objects and advantages of the invention will become apparent as it is described in connection with the accompanying drawing.

Figure 2:
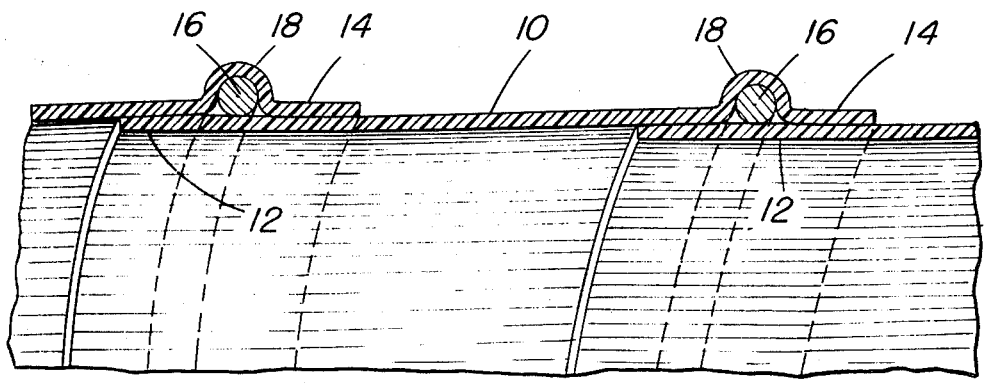

In the drawing:

FIG. 1 is a side elevation view of flexible collapsible tubing embodying the invention; and FIG. 2 is a fragmentary longitudinally section view through a portion of the tubing of FIG. 1 on an enlarged scale.

Referring to the drawing, the invention is described as applied to making of two-element flexible collapsible tubing but is not limited to two-element tubing. As shown, a strip 10 of flexible material is wound helically around a mandrel (not shown) with the trailing edge 12 of one convolution overlapped by the leading edge 14 of a second or succeeding convolution.

The overlap is sufficient to permit a form-giving rod-like member 16 to be wound on the trailing edge 12 before the leading edge 14 of the succeeding convolution is overlapped onto said trailing edge. In that way, the form-giving helix is laid between the trailing edge of one convolution and the leading edge of the succeeding or adjacent convolution through the length of the tubing.

To secure the overlapping edges of the strip to one another, in position covering and enclosing the form-giving rod-like member 16, the rod-like member is straddled by a grooved pressure roller or other pressure member (not shown) which presses on the leading edge of the succeeding convolution on each side of the spiral rib 18 formed around the outer surface of the tubing by the form-giving member 16.

The strip is preferably of flexible elastomeric or other plastic material which has an inherent tackiness or tendency to adhere to a like strip when subjected to pressure so that when two edges are pressed against each other they adhere. One example of such material is uncured synthetic or natural rubber or compositions including rubber. This adherence holds the helical form-giving member in place between the overlapping edges as the tubing is generated, and thereafter; and it actually forms a collapsible tubing having some characteristics of the ultimately desired tubing, but lacking two of the most desirable characteristics which make the final tubing commercially advantageous and of great use in practice. In the tubing as initially formed, the overlapped edges of the strip material can be pulled apart; and the form-giving helix when its convolutions are bent sharply on a tight radius, such as in a 180 degree bend, will remain bent and distorted and will not return to their originally curved position.

To overcome these undesirable characteristics of the tubing as initially formed, the originally formed tubing is subjected to heating in the neighborhood of 350°F. for about 30 to about 45 minutes. These times and temperatures are not critical, however. The heating time may vary in accordance with the temperature. Heating at 350°F. for thirty minutes or at 300°F. for 45 minutes have been found satisfactory. Variations outside and within these limits depend on the diameter and material of which the form-giving helix is made and also depend upon the nature of the strip material.

It is preferred to use a polyamide rod such as nylon for the form-giving helix, although a rod of polyethylene or polypropylene are possible alternatives in some situations. However, nylon has the stiffness and memory desired; and being a thermoplastic material, it can be set by heat treatment and will retain its helical form when cooled, while at the same time remaining resilient and spring-like to permit collapse and bending of the tube and restoration to its expanded condition when the pressure causing collapse is removed.

As an example but not as a limitation upon the invention in practice, it is found when making 4 inch and 6 inch diameter tubing, nylon rod having five thirty-seconds inch diameter has been used satisfactorily while in 8 inch diameter tubing nylon rod with three-sixteenths inch diameter has been satisfactory. In larger diameter tubing, rods of three-sixteenths inch or upward, depending on use and surface demands, may be desirable. It will be understood, however, that the dimensions given are exemplitive preferred usages in practice of the invention and are not limitations upon the scope of the invention. In some cases, rods of less diameter than the mentioned diameter may be desired and sufficient.

A valuable characteristic is imparted to the rod-like material of the form-giving helix by heat treatment. This makes the rod-like member resistant to permanent distortion. For example, a heat-treated convolution or convolutions of the form-giving helix can be bent sharply on a tight radius of about 180 degrees and will return to their original form, whereas an untreated helix will remain bent and deformed when subjected to such a sharp bend. This characteristic of returning to original condition and form is an obvious advantage in cases when the tubing may be subjected to crushing by someone stepping on the tubing or by a vehicle running over or into the tubing and pressing it against an immovable or other stationary object.

An additional valuable characteristic imparted to the tubing by the heating step is that overlapped edges of the flexible strip become welded together. The strip is also cured and ceases to be tacky. During the heating step, the overlapped edges become so firmly joined or welded together that, thereafter, they no longer can be pulled apart as they could before the initially formed tubing was subjected to the heating step.

The flexible strip may be made of or composed of various materials such as a woven fiber-glass or polyamide fabric having a resinous or elastomeric plastic coating or fabric impregnated therewith, but an all-plastic strip is preferred in many instances.

It is possible to use strip material which will not weld when heated and which may have to be stitched together at the seams of the strips by a sewing machine to secure the overlapped edges together and to keep the helix in place. Alternatively, adhesive material could be applied to the overlapping edges to cause them to remain secured together. In such instances, the tubing would still have to be heated to set the form-giving helix in its helical condition and to impart to it the aforesaid desired characteristic of resistance to permanent deformation. If strip material which does not become welded together at its overlapping edges is not used, but the edges are adhered together with an adhesive, the adhesive may become loosened or affected adversely by the action of temperature variations, or moisture or chemicals, either in gaseous or liquid form which would tend to allow the convolutions of the tubing to separate at their seams. Moreover, the use of adhesive introduces an additional complication and additional material costs which are avoided by the use of a synthetic plastic material which becomes welded at the overlapping edges during the heat treatment step.

Many modifications within the scope of the invention will occur to those skilled in the art. Therefore, the invention is not limited to the precise materials and form nor to the precise temperature and time limits mentioned.

What is claimed is:

1. Collapsible flexible tubing comprising flexible strip material wound helically with the edges of adjacent convolutions overlapped and secured together, and a helical resilient rod-like form-giving member overlying said strip material in adjacent convolutions and being overlaid by other convolutions of said strip material, means securing said form-giving member between said overlaid and underlaid convolutions of the strip material, said form-giving member being of thermoplastic material which retains its helical form and resilient condition after heat treatment, said form-giving member having been heat-set into helical form after having been helically wound.

2. Collapsible tubing as claimed in claim 1 in which the strip material includes synthetic plastic material and the edges of adjacent convolutions are overlapped and welded together by heat treatment.

3. Collapsible flexible tubing as claimed in claim 2 in which the adjacent edges of adjacent convolutions of the strip material are overlapped, and the convolutions of the helical form-giving member lie between said overlapped edges.

4. Collapsible flexible tubing as claimed in claim 1 in which the adjacent edges of adjacent convolutions of the strip material are overlapped, and the convolutions of the helical form-giving member lie between said overlapped edges.

5. Collapsible tubing as claimed in claim 1 in which the helical form-giving member is made of a polyamide.

6. Two-element flexible tubing comprising a strip of flexible material wound helically with adjacent edges of successive convolutions overlapped and secured together, and a form-giving helix made from a synthetic plastic rod-like member lying between said over-lapped edges, said form-giving member being of thermoplastic material which retains its helical form and resilient condition after heat treatment, said tubing being heat-set to maintain said forming helix in helical form, whereby said rod-like member tends to return to its helical condition after sharp bending, crushing or deformation.

7. Collapsible tubing as claimed in claim 6 in which the strip material includes synthetic plastic material and the overlapped edges are welded together by the heat treatment of the tubing.

8. Collapsible tubing as claimed in claim 6 in which the form-giving helix is made from a polyamide.

9. Collapsible tubing as claimed in claim 6 in which the strip material initially is a woven polyamide fabric coated with uncured plastic material, said coating in the finished tubing having become cured by said heat treatment and said overlapped edges being welded together thereby.

10. Collapsible tubing as claimed in claim 6 in which the strip material initially is a woven fiber-glass fabric coated with uncured plastic material, said coating in the finished tubing having become cured by said heat treatment and said overlapped edges being welded together thereby.

* * * * *